United States Patent [19]

Janovsky et al.

[11] Patent Number: 5,429,830
[45] Date of Patent: Jul. 4, 1995

[54] MARSHMALLOW-TYPE CONFECTIONS

[75] Inventors: Carol A. Janovsky, North Brunswick; Janet E. McCredie, Ringoes, both of N.J.

[73] Assignee: FMC Corporation, Philadelphia, Pa.

[21] Appl. No.: 272,165

[22] Filed: Jul. 8, 1994

[51] Int. Cl.$^6$ ............................................. A23G 3/00
[52] U.S. Cl. ...................................... 426/94; 426/571; 426/306
[58] Field of Search ............... 426/306, 564, 571, 572, 426/660, 94

[56] References Cited

U.S. PATENT DOCUMENTS

| | | | |
|---|---|---|---|
| 3,023,104 | 2/1962 | Battista et al. | 426/658 |
| 3,067,037 | 12/1962 | Herald et al. | 426/658 |
| 3,682,659 | 8/1972 | Jurczak et al. | 426/571 |
| 3,998,976 | 12/1976 | Pernod et al. | 426/571 |
| 4,145,448 | 3/1979 | Hayward et al. | 426/571 |
| 4,152,463 | 5/1979 | Hayward et al. | 426/571 |
| 4,189,502 | 2/1980 | Rubenstein | 426/571 |

OTHER PUBLICATIONS

Marshmallow Definition—Webster's New World Dictionary, Second College; Edition, World Publishing Co., NY 1972.
Reduced Calorie Marshmallow Recipe—Lite Forum, Pfizer Food Science Group New York City, USA, Special Report, Jun. 1994.

*Primary Examiner*—Jeanette Hunter
*Attorney, Agent, or Firm*—Mark A. Greenfield; Robert L. Andersen

[57] ABSTRACT

A marshmallow-type confection which is rendered heat stable to 400° F. (250° C.) by the inclusion of microcrystalline cellulose (MCC), and which optionally includes at least one natural gum. In additional embodiments, the inventive confection [1] comprises entirely vegetal matter by the replacement of the animal-origin gelatin normally present with a vegetal gum, and/or [2] comprises a reduced calorie confection by the replacement of higher calorie sugars by non-caloric and/or lower-calorie bulking agents comprising additional amounts of MCC and, optionally, lower calorie sugar.

21 Claims, No Drawings

MARSHMALLOW-TYPE CONFECTIONS

BACKGROUND OF THE INVENTION

1. Field of the Invention

This invention relates to a soft spongy marshmallow-type confection which is rendered heat stable up to 250° C. by the inclusion of a colloidal form of microcrystalline cellulose (MCC). In additional embodiments, the inventive confection [1] optionally further comprises entirely non-animal (vegetal) matter by the replacement of the usual animal-origin gelatin ingredient with a vegetal gum, and/or [2] optionally further comprises a reduced calorie confection by the replacement of some of the high-calorie sugars by a bulking agent which is a non-colloidal form of MCC further optionally including one or more low-calorie sugars.

2. Statement of Related Art

The marshmallow originally was a confection made from the root of the marsh mallow plant. Today, it is best known as an aerated, soft, spongy water based confection made of sugar, starch, corn syrup, and gelatin, coated with powdered sugar [Webster's New World Dictionary, Second College Edition, World Publishing Co., New York, World Publishing Co., New York (1972)]. Some commercial marshmallow products also contain dextrose, tetrasodium pyrophosphate, artificial and/or natural flavor, and a whitener such as Blue #1. Marshmallows are not heat stable and will melt at temperatures of approximately between 110° F. (43° C.) and 150° F. (65° C.), making them unsuitable for inclusion in baked goods, although that would be desirable. When manufacturing coated confection, the heat instability of marshmallows also make it difficult to coat them with substances which are applied at a temperature higher than 110° F. (43° C.) such as reduced calorie chocolate. Additionally, the presence of gelatin (a mixture of proteins of animal origin) as a basic ingredient in marshmallows may make them undesirable to those observing vegetarian, kosher, or halal diets.

U.S. Pat. No. 3,023,104 to Battista discloses reduced calorie food compositions containing MCC gels in which the MCC replaces starch in baked goods, replaces sugar in confections, and is added to sausages, puddings, salad dressings, milk chocolate, and the like.

U.S. Pat. No. 3,067,037 to Herald, et al., discloses foamable food products such as dessert toppings containing MCC gels, dispersed by aerosol pressure cans.

A recipe for a reduced calorie marshmallow was disclosed in the June 1994 issue of "Lite Forum", a quarterly advertising publication of the Pfizer Food Science Group, New York City, U.S.A. The stated ingredients were: gelatin (1.8%), added water (total of 18.7%), polydextrose (22%), corn syrup −42 DE (25%), and high fructose corn syrup (32.5%).

BRIEF SUMMARY OF THE INVENTION

In a first embodiment this invention affords a marshmallow-type confection which is heat stable at temperatures above 150° F. (65° C.), preferably up to a temperature of 400° F. (250° C.). The inventive heat stability is achieved by including a colloidal form of microcrystalline cellulose (MCC) in the standard marshmallow formula, in amounts as disclosed herein, with the optional inclusion of one or more food grade gums, such as konjac glucomannan and/or carrageenan.

In a second embodiment the total calories of the inventive confection are reduced by including a non-caloric bulking agent in the confection recipe, comprising a non-colloidal form of MCC optionally with a replacement of at least a part of the high calorie sugars normally present in marshmallow by one or more polyglycols and/or low-calorie sugars.

In a third embodiment, an entirely plant origin (vegetal) marshmallow product is afforded by replacing the prior art marshmallow ingredient gelatin, (an element of animal origin), with at least one vegetal gum.

The foregoing three embodiments can be combined in any manner.

In additional embodiments, this invention comprises processes for the manufacture of such confection; and the use of the inventive confection in baked goods, desserts, candies, and other foods which require heating in excess of 110° F.(43° C.) to 150° F. (65° C.) in their manufacture.

DETAILED DESCRIPTION OF THE INVENTION

As used herein, all percentages are weight percentages unless stated otherwise. Other than in the operating examples, or where otherwise indicated, all numbers expressing quantities of ingredients, parameters, and process conditions used herein are understood as modified in all instances by the term "about".

The essential element for achieving heat stability in the marshmallow confections of this invention is the inclusion of a particular form of microcrystalline cellulose (MCC). MCC is a beta-1,4-glucan which is a tasteless and non-caloric fiber used in many established products in the food industry. The "colloidal" MCC useful in this invention for heat stability purposes may in the form of a colloidal dispersion or aqueous gel, or may be in a dry fine particle form which behaves as a colloid when in an aqueous sol. The dry particle form may be achieved by coprocessing the MCC with various barrier dispersants including carboxymethylcellulose (CMC) in accordance with U.S. Pat. No. 3,539,365 or a sodium/calcium alginate complex in accordance with pending U.S. patent application Ser. No. 57,058 filed 3 May 1993 or its successors, all of which are incorporated herein by reference. Such colloidal MCC products are manufactured and sold by FMC Corporation, Food Ingredients Division, Philadelphia, Pa., U.S.A. under the trademark Avicel using the AC-series of grade designations. Other colloidal forms of MCC useful in this invention for imparting heat stability are MCC coprocessed with with certain specific polysaccharides which include konjac, carrageenan, pectin, locust bean, maltodextrin, xanthan, agar, and combinations thereof. An example of such a colloidal form is manufactured and sold by FMC Corporation, Food Ingredients Division, Philadelphia, Pa., U.S.A. under the trademark Avicel ® RCN-30 and comprises a coprocessed combination of 75 wt % MCC, 20 wt % xanthan, and 5 wt % maltodextrin. It should be noted that all coprocessed MCC/polysaccharides are not useful for imparting heat stability however, for example coprocessed MCC and guar gum.

The MCC useful in this invention as a bulking agent is in a non-colloidal (powder) form, which is distinguishable from the form of MCC imparting heat stability. In its non-colloidal form, the MCC has low water-absorbability and does not form a sol. One example of a non-colloidal MCC is manufactured and sold by FMC Corporation, Food Ingredients Division, Philadelphia, Pa., U.S.A. under the trademark Indulge ™-310. Such a form of MCC is the subject of pending U.S. patent application Ser. No. 949,301 filed 22 Sep. 1993, which is incorporated herein by reference. Other forms of non-colloidal MCC useful as bulking agents in this invention and commonly referred to as "powder grades" also are manufactured and sold by FMC Corporation, Food Ingredients Division, Philadelphia, Pa., U.S.A. under the trademark Avicel ® using the grade designations PH 101, 102, & 105 (having an average particle size under 100μ) and the grade designation FD-100 (having an average particle size of 10–100μ).

Dry sugars useful in manufacturing the inventive marshmallows are well known in the art and may be derived from cane, beets, hydrolyzed corn starch, or other sources. Fructose or sugar powders are also useful, and low calorie sugars such as inulin (a low-calorie sugar extracted from chicory root, dahlia tubers and Jerusalem artichokes, among others) and polydextrose may be used where calorie reduction also is desired. As is also known in the art, sugars such as sorbitol and mannitol are useful but cannot completely replace the primarily dextrose dry sugar because of their occasionally deleterious digestive effects. The origin and nature of the dry sugar used is not critical to the invention, although it should have a DE (dextrose equivalent) value adequate to impart a desirable sweet taste to the product.

Useful starches, where present, are all known in the art, particularly those derived from corn, and may be modified (cross-linked) or unmodified as specified. The origin and nature of the starches used are not critical to the invention.

Sugar syrups useful in manufacturing the inventive marshmallows are well known in the art and include aqueous solutions of sucrose, fructose, dextrose, and the like. Sucrose syrup derived from corn is preferred, but the origin and nature of the sugar syrups are not critical to the invention.

Gelatin is a refined protein of animal origin and is a traditional ingredient in marshmallow confections. It may be replaced in the heat stable marshmallows of the present invention by one or more natural gums of vegetable origin where a vegetarian, kosher, and/or halal product is desired.

The natural gum, should be present where the invention comprises solely a heat-stable marshmallow-type confection, and should be added as an independent ingredient, although some natural gum already may be present when a coprocessed MCC is utilized. The natural gums are optional in the combined heat-stable/reduced calorie and heat-stable/entirely vegetal embodiments of this invention. Useful natural gums are all of those which are food grade and gel-forming, either by themselves, in mixture with each other, or in mixture with non-gelling natural gums. Natural gums or gum combinations forming an elastic gel are preferred. Useful gel-forming natural gums are of vegetal origin and include carrageenan, pectin, gellan, algin and alginates, xanthan, konjac, and mixtures thereof. These gels and their mixtures also may be mixed with non-gelling polysaccharide gums including guar, locust bean, karaya, and arabic. Carrageenan and konjac are the preferred natural gums for use in this invention, carrageenan being most preferred. Even when gelatin is present, it may be desirable for a small amount (0.1 to 1 wt %) of natural gum to be present in addition to the MCC in the inventive heat stable marshmallow confections.

The carrageenan is preferably iota or kappa-type, more preferably iota, to facilitate gelling, and because of its elasticity and ability to provide excellent texture and chewability, which are desirable properties in a product of this type. However, mixtures of predominantly iota with other (kappa, lambda, and/or beta) carrageenans also are useful, especially bearing in mind that these naturally occurring polysaccharides always occur in mixtures of the various types, depending upon the species of Rhodophyceae from which the carrageenan is derived. Carrageenan, carrageenan blends with other hydrocolloids and carrageenan coprocessed products are manufactured and sold worldwide by FMC Corporation, Food Ingredients Division, Philadelphia, Pa., U.S.A. under the trademarks Marine Colloids ®, Gelcarin ®, and Litex ® using various grade designations.

The konjac may be in the form of a purified or clarified flour, or as a blend or coprocessed product with various other hydrocolloids including starch, xanthan gum, carrageenan, and the like. Konjac, konjac blends, and coprocessed konjac products are manufactured and sold by FMC Corporation, Food Ingredients Division, Philadelphia, Pa., U.S.A. under the trademark Nutricol ® using various grade designations.

Because it is desirable that the natural gums used in the inventive marshmallow confections form gels, it may be advantageous to provide suitable gel-inducing cations by including gel-forming effective amounts of food grade alkali metal salts such as potassium, or particularly those alkaline earth metal salts affording divalent cations such as magnesium or calcium among the ingredients, examples of which are calcium sulfate, calcium chloride, calcium phosphate, magnesium chloride, and the like. When certain known gel-forming combinations of natural gums are used, such as konjac with xanthan, gel-inducing cations are not required.

A food grade polyhydric alcohol such as glycerin, propylene glycol, mannitol, sorbitol, or the like, (glycerin being preferred), is usefully present in order to lower the water activity (that is, the available "free" water) of the ingredient mass. An additional benefit of including polyhydric alcohols is that they have a caloric value of only about 1 calorie/gram and can contribute toward lowering the total caloric value of the confection, where desired.

When ingredients which darken or otherwise color the desirably white finished product are present, whiteners such as titanium dioxide, Blue #1, or the like, may also be present.

Natural and/or artificial flavoring, natural and/or artificial coloring, and small amounts of salts may be present in the marshmallow recipe if and when desired, and are not considered a limiting part of this invention. The traditional flavoring for marshmallows is vanilla, but this invention is not limited to any particular flavor and chocolate, fruit, spices, and all others flavors are contemplated. The amounts of flavoring and/or coloring and/or salt are calculated herein as ingredients in addition to 100 wt % of the marshmallow confection itself, and usually are employed in such small quantities that they do not affect the formulation of the confection. Where certain particular flavors are used, especially those having an oil base such as cocoa, slight adjustment of the confection base formula may be required in a manner known in the art.

Heat Stable Marshmallow Ingredient Parameters

For a heat stable marshmallow confection, MCC in a colloidal form must be present in at least 1.75 wt %, preferably from 1.75 to 3 wt %, more preferably 2.25 to 2.75 wt %. Below 1.75 wt % MCC, the desired heat stability is not achieved and above 3 wt % MCC, the ingredients may become too viscous to disperse during the manufacturing process.

Where the colloidal MCC is not already coprocessed with a natural gum, such gum should also be present in at least 0.2 wt %.

The total sugar content, measured as the sum of dry sugar and sugar syrup solids, should be between 60 and 85 wt %.

A food grade polyhydric alcohol should be present in 10 to 20 wt %, preferably 10 to 15 wt %, most preferably 13 wt %.

Gelatin should be present in from 1.5 to 2.2 wt %, preferably 1.6 to 2 wt %, more preferably 1.8 wt %.

Starch should be present in a total of 6 to 10 wt %, preferably 6.5 to 8 wt %, more preferably 6.6 to 7 wt %. To afford the best balance of attributes the starch should be present in approximately equal quantities of an unmodified starch and a modified (cross-linked) starch. Corn starch is preferred because of its availability, but the starch may be from any source.

Flavoring and coloring may be present as needed, preferably amounting to not more than 1.0 wt % based on the total weight of the other ingredients.

Water, comprising both free water and the percent of water in the liquid sugar, must be present in a minimum amount adequate to process the other ingredients and to a total of 100 wt %. The usual amount of water is 10 to 20 wt % free water. It may be noted that the polyhydric alcohol (which usually is a liquid) contributes toward the thixotropic quality of the ingredient mix during manufacture. It also may be noted that where the MCC is added as an aqueous gel it will provide additional liquid during the manufacturing process.

Heat Stable Reduced Calorie Marshmallow Ingredient Parameters

For a reduced calorie marshmallow a bulking agent which is a non-colloidal form of MCC as described herein should be present in 5 to 10 wt %, (preferably 6.5 to 7.5 wt %, more preferably 7 wt %). The non-colloidal MCC must be in addition to the colloidal MCC used to impart heat-stability. Because a reduced calorie marshmallow contains no fat, the only means for calorie reduction is reduction of the carbohydrate content, and because most sugars and starches contain only 4 calories per gram (as contrasted with the 9 calories per gram of a fat or oil) the amount of calorie reduction possible without using a completely artificial sweetener is limited.

It should be understood that the water is itself a non-caloric bulking agent and furthermore that the water in the sugar syrup and the polyhydric alcohol contribute significantly to the total liquids in the ingredient mix and facilitate the manufacture of the confection.

The amounts of gelatin or gum should be the same as in the heat stable marshmallow.

Starch should be eliminated as an ingredient.

A low calorie sugar such as polydextrose or inulin may be present in from 10 to 20 wt %, (preferably from 15 to 19 wt %, more preferably 17 wt %), for further reduction of the calorie content while still retaining a natural sweetness. Below 10 wt % low calorie sugar the recipe does not have sufficient solids, above 20 wt % the recipe might have an off-color or off-taste. The total amount of sugar, measured as solids, should be reduced to from 35 to 60 wt %, (preferably 35 to 45 wt %, more preferably 45 wt %).

Heat Stable Entirely Vegetal Marshmallow Ingredient Parameters

Where a completely vegetal confection is desired, the gelatin is entirely replaced by a gel comprised of one or more of the food grade vegetable gums disclosed herein or a combination of a vegetable gum with an appropriate gelling agent, as disclosed herein. When used for this purpose, the vegetable gum should be present in from 0.25 to 0.6 wt %, preferably 0.3 to 0.5 wt %.

EXAMPLES

Example 1

Heat Stable Inventive Marshmallow-Type Confection

| Ingredient | percentage (by weight) |
| --- | --- |
| sugar | 44.48 |
| water | 15.00 |
| corn syrup (63 DE) | 17.11 |
| glycerin | 13.11 |
| modified corn starch ① | 3.40 |
| corn starch ② | 3.40 |
| cellulose gel [Avicel ® RC-591-F] ③ | 2.00 |
| carrageenan [Gelcarin ®] ③ | 0.50 |
| titanium dioxide | 0.30 |
| vanilla flavor ④ | 0.30 |
| calcium sulfate | 0.25 |
| trisodium phosphate ⑤ | 0.15 |
| | 100.00 |

①Mira-Set 285, A. E. Staley Mfg. Co.
②Mira-Gel 463, A. E. Staley Mfg. Co.
③FMC Corp., Food Ingredients Division, Philadelphia, PA, USA
④N & A Vanilla Flavor #208481, Tastemaker Inc.
⑤FMC Corp., Food Phosphate Division, Philadelphia, PA, USA Manufacturing Procedure for Example 1

1. Disperse the Avicel cellulose gel in available water, glycerin, and corn syrup using a propeller-type mixer.

2. Homogenize at 2500 rpm first stage, 500 rpm second stage.

3. Dry blend the sugar, Gelcarin carrageenan, starches, and calcium sulfate and add to the Avicel cellulose gel dispersion with vigorous agitation.

4. While stirring, heat the mixture to 190° F. (88° C.); most of the sugar should be dissolved.

5. Add the trisodium phosphate, flavor, and titanium dioxide.

6. Add 500 grams of the resulting batch to a Hobart mixer bowl and whip using a wire whip at speed #2 for 2 - 5 minutes to achieve the desired overrun.

7. Extrude the whipped product through a pastry bag or other suitable controlled device onto a desired surface.

Example 2

Reduced Calorie Chocolate Coated Inventive Marshmallow Cookie

2A—Reduced Fat Chocolate Coating—A reduced calorie chocolate coating of a type known in the art was prepared as follows:

| ingredient | percentage |
| --- | --- |
| sucrose | 62.00 |
| water | 12.60 |
| glycerin | 8.00 |
| liquid fructose | 6.00 |
| cocoa (1) | 4.00 |
| partially hydrogenated soybean oil (2) | 3.00 |
| Novagel ® RCN-15 MCC/guar (3) | 2.00 |
| starch (4) | 1.50 |
| salt | 0.40 |
| polysorbate 80 | 0.25 |
| vanilla flavor (5) | 0.25 |
| | 100.00 |

(1) D-11-S, DeZaan Cocoa
(2) Shurset K, Anderseon Clayton/Humko Products
(3) FMC Corp., Food Ingredients Division, Philadelphia, PA, U.S.A.
(4) Miragel ® 463, A. E. Staley
(5) N & N Vanilla Flavor #208481, Tastemaker, Inc.

Manufacturing Procedure for Example 2A (Reduced Fat Chocolate Coating)

1. Disperse Novagel® RCN-15 coprocessed MCC/guar in available water using high shear agitation and mix for 10–15 minutes
2. Dry blend the sucrose, cocoa, starch, salt, and flavor using a Hobart TM mixer.
3. Blend together the glycerin, fructose, Novagel dispersion, and soybean oil using a propeller type mixer and heat to a minimum of 185° F. (85° C.),
4. Add dry ingredients while mixing and continue heating to 200° F. (93° C.) which is a temperature above that at which prior art marshmallow is stable.

2B—Coating of Inventive Marshmallow-Confection Placed on Cookie
Manufacturing Procedure 1. Prepare a heat stable marshmallow filling according to Example 1.
2. Extrude marshmallow filling onto a chocolate wafer using a pastry bag and top with another chocolate wafer if desired.
3. Pour the coating of 2a while at 200° F. (93° C.) directly onto the marshmallow filling and cool to room temperature before packaging.

Approximate Specifications: (Cookies with two chocolate wafers)

The total weight of the cookie was measured as approximately 65 grams.

The ratio of coating to cookie to filling was measured as 42 to 20 to 38.

The Water Activity of the cookie was measured as 0.57 using an AquaLab TM Water Activity Meter model CX2, (a product of Decagon Devices, Inc., Pullman, Wash., U.S.A.).

The calories per cookie (excluding wafer) were calculated as 170.

Detailed Analysis

| Attribute (per gram) | Filling | Coating |
| --- | --- | --- |
| Calories | 3.11 | 3.45 |
| Fat | 0.0 | 0.035 |
| Carbohydrate | 0.66 | 0.70 |
| Protein | 0.008 | negligible |

Example 3

Reduced Calorie (26%) Inventive Marshmallow Confection

| ingredient | percentage |
| --- | --- |
| liquid sucrose | 28.00 |
| corn syrup (62 DE) | 18.00 |
| polydextrose | 17.00 |
| high fructose corn syrup (55 DE) | 12.00 |
| water | 7.50 |
| non-colloidal MCC [Indulge-310](1) | 7.50 |
| glycerin | 5.20 |
| colloidal MCC [Avicel CL-611](1) | 3.50 |
| gelatin [type A, 250 bloom] | 1.80 |
| vanilla flavor | 0.30 |
| titanium dioxide | 0.20 |
| | 100.00 |

(1) a trademark of FMC Corporation, Food Ingredients Division, Philadelphia, PA, U.S.A.

Procedure

1. While heating 50 wt % of liquid sucrose to 150° F. (65.5° C.), add gelatin under vigorous agitation.
2. In separate container, combine remainder of liquid sucrose, glycerin, corn syrup, and high fructose corn syrup. While heating to 150° F. (65.5° C.), add polydextrose to solubilize.
3. Add Avicel CL-611 colloidal MCC to sugar syrup using a propeller-type mixer.
4. Add Indulge LM-310 non-colloidal MCC, flavor and color.
5. Homogenize at 500 psi first stage, 2500 psi second stage.
6. Add above mixture to sugar/gelatin syrup.
7. Cool to approximately 200° F. (93° C.) and use Oakes TM mixer to incorporate air.

| Oakes Mixer Parameters: | |
| --- | --- |
| rotor rpm | 1400 |
| pump rpm | 10 |
| air pressure (psi) | 80 |
| air flowrator (ccm) | 200 |
| back pressure (psi) | 60–65 |
| ID of discharge hose (in.) | ⅜ |
| discharge hose length (ft.) | 8 |
| rotor type | A |
| temperature (initial) | 120° F. (49° C.) |
| temperature (final) | 107° F. (41.5° C.) |

Example 4

Entirely Inventive Marshmallow Confection

A marshmallow-type confection according to this invention was made in which a iota-carrageenan, a gel-forming natural gum, was substituted for the gelatin. This saved the step of soaking the gelatin, which normally was required, and afforded a satisfactory completely vegetal product.

We claim:

1. In a marshmallow-type confection comprising sugar, starch, corn syrup, and gelatin, the improvement comprising the impartation of heat stability to 43° C. by the inclusion of at least 1.75 wt % of a food grade colloidal microcrystalline cellulose (MCC).
2. The improved marshmallow-type confection of claim 1 wherein the food grade colloidal MCC comprises MCC coprocessed with carboxymethyl cellulose (CMC).
3. The improved marshmallow-type confection of claim 1 wherein the food grade colloidal MCC comprises MCC coprocessed with a calcium/sodium alginate complex.

4. The improved marshmallow-type confection of claim 1 wherein the food grade colloidal MCC comprises MCC coprocessed with a gel-forming polysaccharide which is konjac, carrageenan, pectin, locust bean gum, maltodextrin, xanthan, agar, or a gel-forming mixture thereof.

5. The improved marshmallow-type confection of claim 1 wherein the colloidal MCC is included in up to 3.0 wt %.

6. The improved marshmallow-type confection of claim 1 wherein the colloidal MCC is included in 2.25 to 2.75 wt %.

7. The improved marshmallow-type confection of claim 2 wherein the colloidal MCC is included in 2.25 to 2.75 wt %.

8. The improved marshmallow-type confection of claim 4 wherein the colloidal MCC is included in 2.25 to 2.75 wt %.

9. In a marshmallow-type confection comprising sugar, starch, corn syrup, and gelatin, the improvement comprising the impartation of heat stability above 43° C. by the inclusion of about 1.75 to 3.0 wt % of a food grade colloidal microcrystalline cellulose (MCC) and the substitution of a gel-forming vegetal gum for the gelatin.

10. In a marshmallow-type confection comprising sugar, starch, corn syrup, and gelatin, the improvements comprising (a) the impartation of heat stability above 43° C. by the inclusion of about 1.75 to 3.0 wt % of a food grade colloidal microcrystalline cellulose (MCC) and (b) the reduction of total calories in the confection by the replacment at least part of the sugar with a bulking agent comprising a non-colloidal MCC, optionally with a further partial replacement of the sugar with a lower-calorie sugar.

11. A marshmallow-type confection heat-stable to 43° C. comprising:
   1.75 to 3.0 wt % colloidal microcrystalline cellulose (MCC);
   60 to 85 wt % total sugar measured as the sum of dry sugar and sugar syrup solids;
   10 to 20 wt % food grade polyhydric alcohol;
   1.5 to 2.2 wt % gelatin;
   6 to 10 wt % starch;
   0 to 1 wt % flavoring and coloring; and
   water q.s. to 100 wt %.

12. The marshmallow-type confection of claim 11 wherein the MCC is present in 2.25 to 2.75 wt %.

13. The marshmallow-type confection of claim 11 wherein the colloidal MCC is: an aqueous MCC gel; a dry fine particle MCC; MCC coprocessed with a barrier dispersant; or MCC coprocessed with konjac, carrageenan, pectin, locust bean gum, agar, a combination of xanthan and maltodextrin, or a mixture thereof.

14. The marshmallow-type confection of claim 11 wherein the colloidal MCC is coprocessed with: carboxymethylcellulose (CMC); an alginate complex; or xanthan and maltodextrin.

15. In a marshmallow-type confection comprising sugar, starch, corn syrup, and gelatin, the improvement comprising providing an entirely vegetal confection by replacing said gelatin with 0.25 to 0.6 wt % of a gel-forming vegetable gum.

16. In a marshmallow-type confection comprising sugar, starch, corn syrup, and gelatin, the improvements comprising: (a) the impartation of heat stability above 43° C. by the inclusion of 1.75 to 3.0 wt % of a food grade colloidal microcrystalline cellulose (MCC); and (b) providing an entirely vegetal confection by replacing said gelatin with 0.25 to 0.6 wt % of a gel-forming vegetable gum.

17. The marshmallow-type confection of claim 16 wherein the MCC is present in 2.25 to 2.75 wt %.

18. The marshmallow-type confection of claim 16 wherein the colloidal MCC is: an aqueous MCC gel; a dry fine particle MCC; MCC coprocessed with a barrier dispersant; or MCC coprocessed with konjac, carrageenan, pectin, locust bean gum, agar, a combination of xanthan and maltodextrin, or a mixture thereof.

19. The marshmallow-type confection of claim 16 wherein the colloidal MCC is coprocessed with: carboxymethylcellulose (CMC); an alginate complex; or xanthan and maltodextrin.

20. A heat-stable, reduced calorie marshmallow-type cookie comprising:
   at least one base cake;
   a heat-stable, reduced calorie marshmallow-type filling according to claim 10 on or between said base cake(s); and
   a reduced fat chocolate coating having a melting point above 150° F. (65° C.).

21. A reduced calorie marshmallow-type confection comprising:
   a heat-stable, reduced calorie marshmallow-type filling according to claim 10; and
   a reduced fat chocolate coating having a melting point above 150° F. (65° C.).

* * * * *